(12) United States Patent
Kondo

(10) Patent No.: US 6,281,992 B1
(45) Date of Patent: Aug. 28, 2001

(54) IMAGE REPRODUCING METHOD AND APPARATUS

(75) Inventor: Hirokazu Kondo, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 08/904,357

(22) Filed: Aug. 1, 1997

(30) Foreign Application Priority Data

Aug. 1, 1996 (JP) .................................................. 8-203413

(51) Int. Cl.$^7$ ...................................................... H04N 1/46
(52) U.S. Cl. ............................ 358/501; 358/1.9; 358/532; 382/275
(58) Field of Search .................................. 358/406, 442, 358/468, 530, 500–501, 505–506, 522–524, 532, 538, 1.9; 345/501; 382/261, 266–267, 162, 275, 167

(56) References Cited

U.S. PATENT DOCUMENTS

| | | | |
|---|---|---|---|
| 5,357,353 | * 10/1994 | Hirota | 358/530 |
| 5,432,906 | * 7/1995 | Newman et al. | 345/501 |
| 5,696,850 | * 12/1997 | Parulski et al. | 382/261 |
| 5,933,254 | * 8/1999 | Webb | 358/500 |

FOREIGN PATENT DOCUMENTS 0 817 470 A1 * 7/1998 (EP) .............................. H04N/1/60

* cited by examiner

*Primary Examiner*—Leo Boudreau
*Assistant Examiner*—Ishrat Sherali
(74) *Attorney, Agent, or Firm*—Sughrue, Mion, Zinn, Macpeak & Seas, PLLC

(57) ABSTRACT

This image reproducing method comprises the steps of preparing profiles that are respectively set to correspond to an input device and an output device to be used and are employed for correcting MTF (Modulation Transfer Function) characteristics; processing image data fetched in through the input device by means of the profiles; then subjecting the image data thus processed by the profiles to predetermined image processing; processing the image data thus subjected to the predetermined image processing by means of the profiles again; supplying the image data thus processed again by the profiles to the output device; and outputting the reproduced image on the basis of the image data thus supplied. The independence of image processing from the devices is strengthened, irrespective of the kinds of the input/output devices, and the reproduced image having the same color/density and also the same image structure can stably be output from the same original image in the open system using the improved image reproducing method and the improved image reproducing apparatus for implementing this method.

20 Claims, 2 Drawing Sheets

IMAGE REPRODUCING METHOD AND APPARATUS

BACKGROUND OF THE INVENTION

The present invention relates to an image reproducing method and apparatus, more particularly, to image processing technology in an open system corresponding to a plurality of kinds of input devices and output devices.

An image reproducing system for obtaining a reproduced image by subjecting the image data fetched in through an input device such as a scanner, an image reading device or the like to predetermined image processing such as gradation adjustment, sharpness correction and so on, and supplying the image data thus subjected to the image processing to an output device such as a display, a printer or the like has been put to various uses.

In such an image reproducing system as described above, the input device such as an image reading device or the like, an image processing unit for performing the predetermined image processing and the output device for outputting the reproduced image are normally made to one-to-one correspond to one another.

With the development of computers, workstations and the like in recent years, use is increasingly made of an open system corresponding to a plurality of kinds of input devices and/or output devices: for example, a system capable of reproducing images by making a workstation subject the image data read by an image reading device to image processing, and outputting the image data thus processed to a printer, a CRT and the like; and a system capable of outputting reproduced images by using an image reading device and a digital camera for fetching in one sheet of original image and subjecting the image data thus obtained to image processing individually in a workstation.

In the open system like this, it is required to obtain the same reproduced image stably when the same original image is processed, irrespective of the kind of the input/output device.

In the printing field wherein the progress of DTP (Desk Top Publishing) is conspicuous, for example, printing is carried out through the steps of causing an image reading device to photoelectrically read an original image, a workstation to process the original image data that has been read, an image recording device using photosensitive materials to output a reproduced image as a proof to be corrected, and then of preparing a printing plate after the termination of proof corrections.

Therefore, the reproduced image after the proof corrections is required to properly conform to a printed image. It is also required for the same proof to be stably output even when the original reading device and the image recording device for outputting a proof are replaced.

Notwithstanding, the characteristics of input and output devices usually vary with the kind of the device, irrespective of the printing field, and in the open system in which the plurality of kinds of input and output devices are dealt with, there is a problem arising from the fact that the color/density, image structure and the like of the reproduced image are varied by the input and output devices, even if an image is reproduced using the same original image.

In order to solve this problem, ICC (International Color Consortium) proposes ICC Profile Format Specification.

This specification is aimed to output the same image from one original image without relying on the characteristics of input and output devices by having a conversion table for converting image data on R, G and B into image data on an XYZ colorimetric system of CIE (Commission International de l'Eclairage) and a 3×3 matrix as device profiles as far as, for example, image data on red (R), green (G) and blue (B) is concerned; by processing the image data on R, G and B fetched in through the input device to convert the RGB image data to the image data on the XYZ colorimetric system; by subjecting the XYZ image data to various kinds of image processing; and ultimately converting the XYZ image data to image data (e.g., image data on R, G and B, and C, M, Y and K) corresponding to the output device.

By the use of this method disclosed in the above specification, it becomes possible to output the same color/density image from the same original image without relying on the kind of input/output device in such an open system.

Even in the method above, however, image structure dependent on sharpness and the like still tends to vary with the kind of input/output devices and when a device is changed in the open system, images having the same image structure cannot be output from one original image with stability. In consequence, the operator's feeling will have to be relied on under the present circumstances as far as the image structure of the reproduced image is concerned.

SUMMARY OF THE INVENTION

An object of the present invention intended to solve the foregoing problems posed in the prior art is to provide an image reproducing method and apparatus in an open system for image processing capable of corresponding to a plurality of kinds of input and output devices, which method and apparatus can strengthen the independence of image processing from the device, irrespective of the kind of the input/output device, so that reproduced images having the same image structure are output from the same original image with stability.

In order to accomplish the object above, the invention provides an image reproducing method for subjecting image data fetched in through an input device to predetermined image processing and making an output device output a reproduced image on the basis of the thus processed image data comprising the steps of:

preparing profiles that are respectively set to correspond to the input device and the output device to be used and are employed for correcting MTF (Modulation Transfer Function) characteristics;

processing the image data fetched in through the input device by means of said profiles; then subjecting the image data thus processed by said profiles to said predetermined image processing;

processing the image data thus subjected to the predetermined image processing by means of said profiles again;

supplying the image data thus processed again by the profiles to the output device; and outputting the reproduced image on the basis of the image data thus supplied.

In a preferred embodiment, the profiles comprises device profiles for correcting respective MTF characteristics of the image data fetched in through the respective input devices and device profiles for correcting respective MTF characteristics of the image data subjected to the predetermined image processing due to the respective output devices. The profiles are preferably two-dimensional space filters.

In another preferred embodiment, the two-dimensional space filter carries out a matrix calculation with a weighing coefficient for correcting the deterioration of the MTF characteristics in each device.

In still another preferred embodiment, the predetermined image processing is at least one of color/density correction, gradation correction, sharpness correction, K-channel formation and UCR (Under Color Removal).

The invention also provides an image reproducing apparatus comprising:

a plurality of input devices for fetching in image data;

an image processing device for receiving the image data thus fetched in through the input device and subjecting the image data to predetermined image processing;

a plurality of output devices for receiving the image data processed by the image processing device and outputting a reproduced image; and profiles that are set to correspond to the respective input and output devices and used for correcting the MTF (Modulation Transfer Function) characteristics of the input and output devices; wherein when outputting the reproduced image by the output device, the image data fetched in through said input device to said predetermined image processing by said image processing device after being processed by said profiles, and the image data thus subjected to said predetermined image processing is processed by the profiles before being supplied to the output device.

In a preferred embodiment, the profiles comprise device profiles for the input devices and device profiles for the output devices.

In another preferred embodiment, both the device profiles for the input and output devices are incorporated in the image processing device and connected to an image processing space for subjecting the image data received from the input device to the predetermined image processing.

In still another preferred embodiment, the device profiles for the input devices are incorporated in the respective input devices and the device profiles for the output devices are incorporated in the respective output devices.

DETAILED DESCRIPTION OF THE INVENTION

A detailed description will subsequently be given of an image reproducing method and apparatus according to the present invention.

Figure 1:
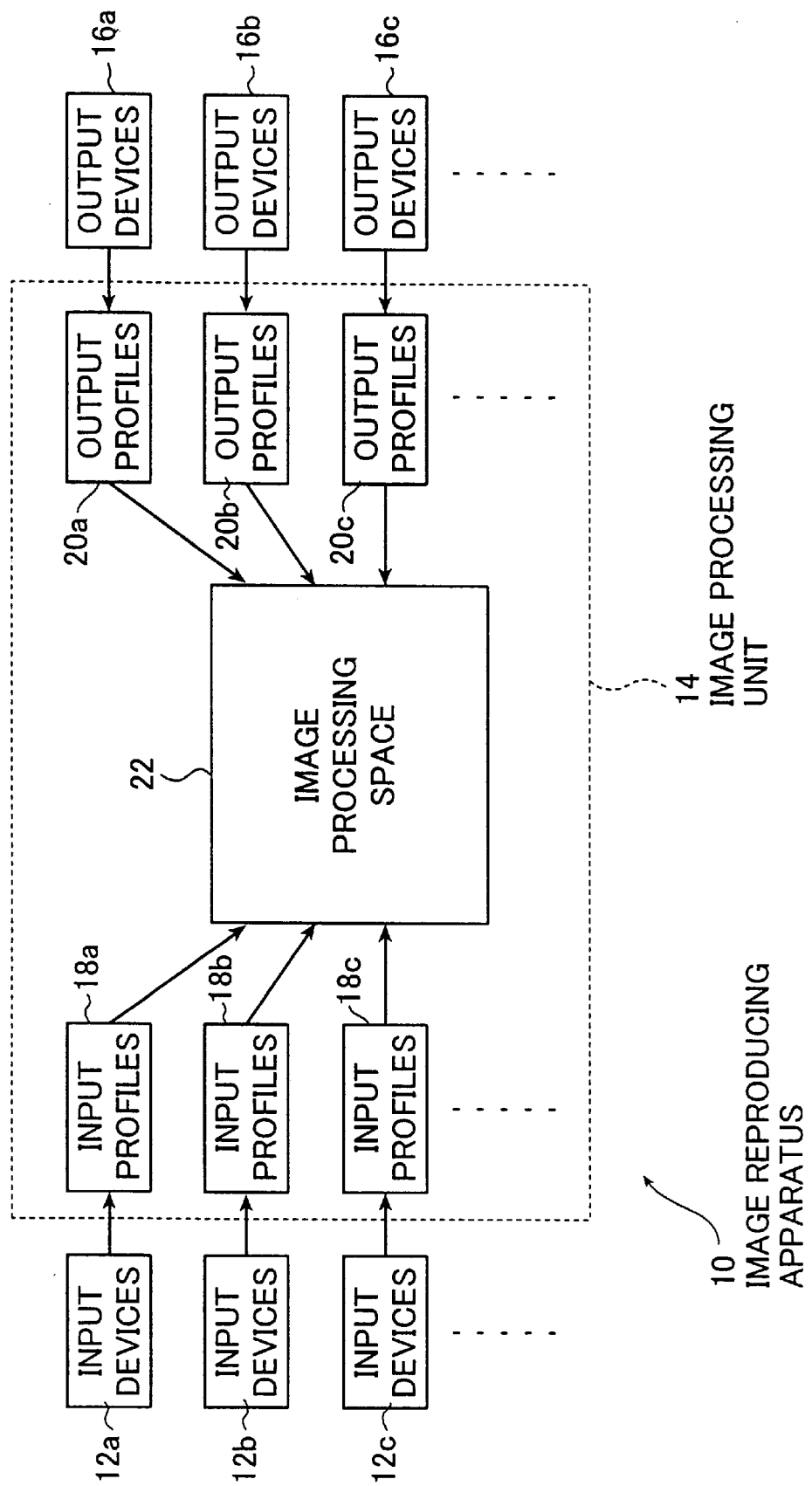
FIG. 1 is a diagram conceptually illustrating an exemplary image reproducing apparatus according to the present invention.

FIG. 1 is a diagram conceptually illustrating an exemplary image reproducing apparatus according to the present invention for implementing an image reproducing method according to the present invention.

An image reproducing apparatus 10 shown in FIG. 1 is an apparatus adapted for use in subjecting the image data fetched in through input devices to predetermined image processing and then supplying the image data to output devices for reproducing purposes. The image reproducing apparatus 10 comprises a plurality of input devices 12 (12a, 12b, . . . ), an image processing unit 14 for subjecting the image data fetched in through each of the input devices 12 to predetermined processing, and a plurality of output devices 16 (16a, 16b, . . . ) for reproducing the images thus processed in the image processing unit 14.

In this case, any one of the known devices capable of photoelectrically reading images carried with originals and photographic objects and outputting them as digital image data is utilizable as the input device 12 according to the present invention; for example, an image reader or an image reading (inputting) device for photoelectrically reading the light reflected from or transmitted through an original by means of scanning exposure and surface exposure, a digital camera, a digital video camera and so forth are devices of the sort mentioned above.

On the other hand, various image output media for forming visual images or latent images from the received image data are all utilizable as the output device 16 according to the present invention; for example, various kinds of printers (image exposure apparatus) using photosensitive materials such as a silver salt photographic (sensitive) material, an electronic photographic material and so forth, thermal printers using heat sensitive recording materials, various kinds of displays such as a CRT (Cathode Ray Tube), liquid crystal displays and so forth.

The input and output devices according to the present invention may be a plurality of the same kind of devices (e.g., a plurality of sets of different machine types and/or the same machine type of the image readers or the printers) or a plurality of different kinds of devices (e.g., the image reading devices and the digital cameras or the printers and the displays, for example) or otherwise a combination of both.

The image processing unit 14 (hereinafter called the "processing unit 14") is used for subjecting the image data fetched in through the input devices 12 to the predetermined image processing and supplying the image data to the output devices 16. The processing unit 14 comprises profiles 18 (18a, 18b, 18c. . . ) which are set to correspond to the input devices 12 to which the profile s 18 are respectively connected, profiles 20 (20a, 20b, 20c. . . ) which are set to correspond to the output devices 16 to which the profiles 20 are respectively connected, and an image processing space 22 for performing various kinds of imaging processing.

The image processing space 22 is a region in which the image data fetched in through the input devices 12 is subjected to various kinds of image processing such as color/density correction, gradation (tone) correction, sharpness correction, K-channel formation, UCR (Under Color Removal) and the like, and further to conversion corresponding to each of the output devices 16 such as tone conversion and thinning-out of pixels and the like. An image processing circuit, a memory and so forth are placed in the image processing space 22.

In the image processing space 22 are, moreover, means for selecting the profiles 18, 20 corresponding to the input devices 12 as image data supply sources as well as the output devices 16 for supplying reproduced images, respectively.

The profiles 18, 20 are some kinds of image processing devices which are set to correct the output (Modulation Transfer Function) characteristics of the image data in accordance with the MTF characteristics-of the respective input and output devices 12a, 12b, . . . and 16a, 16b, . . . , and are respectively set up and established for the respective input and output devices which are connected (or may be connected) to the respective profiles.

The image processing space 22 is used for selecting the profile 18 corresponding to the input device 12 and the profile 20 corresponding to the output device 16; allowing the image data supplied from the input device 12 to be passed through the corresponding profile 18 for being processed by the corresponding profile 18 and then subjecting the image data thus processed by the corresponding profile 18 to the aforementioned predetermined image processing; and allowing the image data thus subjected to predetermined image processing to be passed through the corresponding profile 20 for being processed by the corresponding profile 20 and then supplying the image data thus processed by the corresponding profile 20 to the output device 16.

In an open system corresponding to the plurality of input devices and the plurality of output devices as described above, the problem is that even when the same original image is reproduced, the color/density and the image structure of the reproduced image tend to vary with the device used. With respect to the color/density, the difference in the reproduced image, device by device, is absorbed by the use of the above-described ICC Profile Format Specification and the like so as to obtain the same reproduced image, though the operator's feeling will have to be relied on under the present circumstances as far as the image structure is concerned.

On the contrary, according to the present invention, the provision of such profiles 18, 20 corresponding to each device makes it possible to obtain a reproduced image having the same image structure from the same original image without relying on the input or output device; for example, more specifically, unless a print is specific one, a reproduced image having the same sharpness is obtainable and in the case of a half-tone image such as printed matter, a reproduced image having the same sharpness and the same moire, for example, is obtainable.

As the profile, the present invention employs the parameter of correcting the deterioration of the MTF characteristics in each device by paying special attention to the MTF characteristics of the device, particularly when an image is input to and output from the device as a primary factor in the fluctuation of the image structure of the reproduced image, depending on the device. As shown in FIG. 1, the profiles 18, 20 are two-dimensional space filters which are set to correct the deterioration of the MTF characteristics when the image data is input to and output from the device and which correct the deterioration of the MTF characteristics in each device, for example, by carrying out a matrix calculation with a weighing coefficient.

In other words, the profile 18a corresponding to the input device 12a corrects the deteriorated portion of the MTF characteristics of the image data that is output from the input device 12a so as to make the image data approximate to an original image. The profile 20a corresponding to the output device 16a corrects the deteriorated portion of the MTF characteristics in the output device 16a beforehand so as to make the output image from the output device approximate to the original image.

When, for example, the characteristics on the high-frequency side of the MTF characteristics are deteriorated because of the input-output in the devices, moreover, the profiles 18, 20 are set to raise the gain on the high-frequency side so that the deterioration of the characteristics may be corrected.

Therefore, according to the present invention, the deterioration portion of the MTF characteristics of the image data output from the input device 12 is corrected and the image data can be subjected to image processing in such a state that it approximates to the original image in the image processing space 22, which results in correcting the deteriorated portion of the MTF characteristics due to the output device 16a, and therefore the independence of the image processing (image processing space 22) from the device can be strengthened.

The method of preparing the two-dimensional filter is not restrictive but may be such that what corrects the deterioration of the MTF characteristics because of the input-output in the devices is properly set according to the resolution of the device, the number of channels (e.g., one channel for monochrome and three channels for color), range width (e.g., number of bits of the image data) and so forth. Further, the number of two-dimensional space filters to be provided for each device is not necessarily one but may be more than one, depending on the resolution, the color channel, the range of the channel and so on. that the device supports. A plurality of two-dimensional space filters may be used selectively.

Further, the size of the filter (e.g., the size of the matrix) is not especially restrictive but is optional in accordance with the resolution of the image and the like.

Although the processing unit 14 is provided with a profile corresponding to each of the input-output devices in the example shown above, it may additionally be arranged according to the present invention that, for example, each device has a profile corresponding to itself for the purpose of exchanging image data with the image processing space 22 via the profile.

Further, the profile may be chosen by each device instead of the image processing space 22 or otherwise the profile and each device may be fixedly connected.

Figure 2:
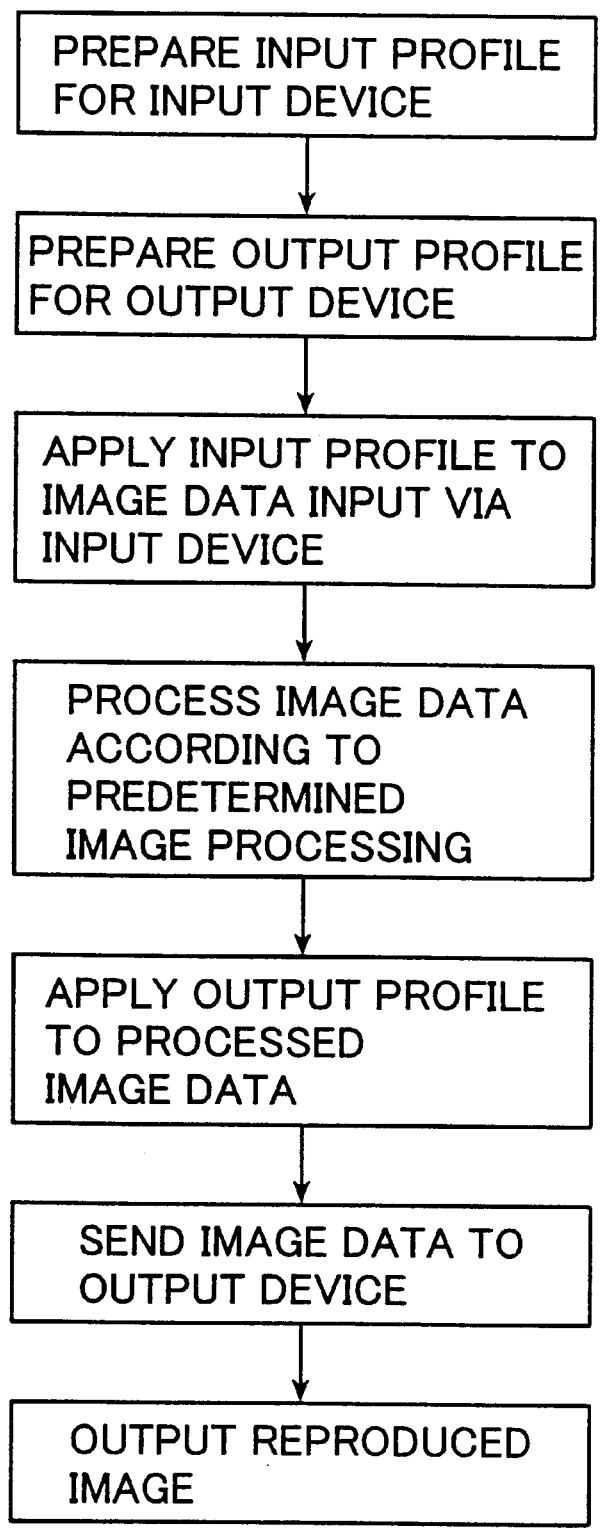
FIG. 2 is a flow diagram for illustrating an exemplary image reproducing method according to the present invention.

A brief description will subsequently be given of the function, diagrammatically illustrated in FIG. 2, of the image reproducing apparatus 10.

When the operation is started in the image reproducing apparatus 10, the input device 12 and the output device 16 that are intended for use are determined first and then the image processing space 22 of the processing unit 14 selects the profile 18 corresponding to the input device 12 as the image data supply source as well as the profile 20 corresponding to the output device 16 to which the image data is supplied.

There will be given the description of a case where the input device 12a, the output device 16b and the output device 16c are used by way of example.

When the operation of fetching in image data from an original image by the input device 12a is terminated, the image processing space 22 receives the image data from the input device 12a via the profile 18a, subjects the image data processed by the profile 18a to the predetermined image processing such as color/density correction, gradation correction, sharpness correction and the like and subsequently converts the image data to those corresponding to the respective image outputs by the output device 16b and the output device 16c.

When the image processing is terminated, the image processing space 22 outputs the image data corresponding to the output device 16b via the profile 20b, supplies the image data processed by the profile 20b to the output device 16b, simultaneously or subsequently outputs the image data corresponding to the output device 16c via the profile 20c, and supplies the image data processed by the profile 20c to the output device 16c.

Upon receipt of the image data, both the output devices 16b, 16c output reproduced images through the predetermined operations.

In the image reproducing apparatus 10, the reproduced images that are output from both the output devices are those which have the same image structure since the image data has been passed through the aforementioned profiles 18a, 20b or the profile 20c before and after the image processing.

Although a detailed description has been given of the image reproducing method and apparatus according to the present invention, the invention is not limited to the aforementioned embodiment thereof but may be modified in various manners without departing from the scope and spirit of the invention.

As described above in detail, the independence of image processing from the devices is strengthened, irrespective of the kinds of the input/output devices, and the reproduced image having the same color/density and also the same image structure can stably-be output from the same original image in the open system using the image reproducing method and apparatus according to the present invention.

What is claimed is:

1. An image reproducing method for subjecting image data fetched in through an input device to predetermined image processing and making an output device output reproduced image on the basis of processed image data comprising the steps of:

preparing at least one input profile that is set to correspond to only said input device, said at least one input profile being employed for correcting MTF (Modulation Transfer Function) characteristics of only said input device;

correcting said MTF characteristics of said input device by subjecting said image data fetched in through said input device to said at least one input profile corresponding to only said input device;

preparing at least one output profile that is set to correspond to only said output device, said at least one output profile being employed for correcting MTF characteristics of only said output device;

correcting said MTF characteristics of said output device by subjecting said image data to be output through said output device to said at least one output profile corresponding to only said output device;

subjecting said image data processed by said at least one input profile to said predetermined image processing;

supplying said image data to said output device; and outputting said reproduced image on the basis of said image data supplied to said output device.

2. An image reproducing method according to claim 1, wherein said at least one input profile and said at least one output profile profiles are two-dimensional space filters.

3. An image reproducing method according to claim 2, wherein said two-dimensional space filters carry out matrix calculations with weighing coefficients for correcting deterioration of the MTF characteristics in each of said input device and said output device.

4. An image reproducing method according to claim 1, wherein said predetermined image processing is at least one of color/density correction, gradation correction, sharpness correction, K-channel formation and UCR (Under Color Removal).

5. An image reproducing apparatus comprising:

plurality of input devices for fetching in image data;

an image processing device for receiving said image data fetched in through said input devices and subjecting said image data to predetermined image processing;

plurality of output devices for receiving said image data processed by said image processing device and outputting reproduced image;

input profiles that are set to correspond to MTF (Modulation Transfer Function) characteristics of only the respective input devices, wherein said input profiles are applied to said image data for correcting said MTF characteristics of only said respective input devices; and output profiles that are set to correspond to MTF characteristics of only the respective output devices, wherein said output profiles are applied to said image data for correcting said MTF characteristics of only said respective output devices.

6. An image reproducing apparatus according to claim 5, wherein said input profiles and said output profiles comprise device profiles for said input devices and device profiles for said output devices respectively.

7. An image reproducing apparatus according to claim 6, wherein both said device profiles for said input and output devices are incorporated in said image processing device and connected to an image processing space for subjecting said image data received from said input devices to said predetermined image processing.

8. An image reproducing apparatus according to claim 6, wherein said device profiles for said input devices are incorporated in the respective input devices and said device profiles for said output devices are incorporated in the respective output devices.

9. An image reproducing method for subjecting image data fetched in through an input device to predetermined image processing and making an output device output reproduced image on the basis of processed image data comprising the steps of:

preparing at least one input profile that is set to correspond to only said input device, said at least one input profile being employed for correcting MTF (Modulation Transfer Function) characteristics of only said input device;

correcting said MTF characteristics of said input device by subjecting said image data to said at least one input profile corresponding to only said input device;

preparing at least one output profile that is set to correspond to only said output device, said at least one output profile being employed for correcting MTF characteristics of only said output device;

subjecting said image data to said predetermined image processing;

correcting said MTF characteristics of said output device by subjecting said image data to be output through said output device to said at least one output profile corresponding to only said output device;

supplying said image data to said output device; and outputting said reproduced image on the basis of said image data supplied to said output device.

10. An image reproducing method according to claim 9, wherein said at least one input profile and said at least one output profile are two-dimensional space filters.

11. An image reproducing method according to claim 10, wherein said two-dimensional space filters carry out matrix calculations with weighing coefficients for correcting deterioration of the MTF characteristics in each of said input device and said output device.

12. An image reproducing method according to claim 9, wherein said predetermined image processing is at least one of color/density correction, gradation correction, sharpness correction, K-channel formation and UCR (Under Color Removal).

13. An image reproducing method for subjecting image data fetched in through an input device to predetermined image processing and making an output device output a reproduced image on the basis of processed image data comprising the steps of:

a) preparing at least one input profile that is set to correspond to said input device, said at least one input profile being employed for correcting MTF (Modulation Transfer Function) characteristics of said input device;

b) preparing at least one output profile that is set to correspond to said output device, said at least one output profile being employed for correcting MTF characteristics of said output device;

c) correcting said MTF characteristics of said input device by subjecting said image data fetched in through said input device to said at least one input profile corresponding to said input device;

d) subsequent to step c), subjecting said image data processed by said at least one input profile to said predetermined image processing;

e) subsequent to step d, correcting said MTF characteristics of said output device by subjecting said image data to be output through said output device to said at least one output profile corresponding to said output device;

f) supplying said image data to said output device; and g) outputting said reproduced image on the basis of said image data supplied to said output device.

14. An image reproducing method according to claim 13, wherein said at least one input profile and said at least one output profile are two-dimensional space filters.

15. An image reproducing method according to claim 14, wherein said two-dimensional space filters carry out matrix calculations with weighing coefficients for correcting deterioration of the MTF characteristics in each of said input device and said output device.

16. An image reproducing method according to claim 13, wherein said predetermined image processing is at least one of color/density correction, gradation correction, sharpness correction, K-channel formation and UCR (Under Color Removal).

17. An image reproducing apparatus comprising:

plurality of input devices for fetching in image data;

an image processing device for receiving said image data fetched in through said input devices and subjecting said image data to predetermined image processing;

plurality of output devices for receiving said image data processed by said image processing device and outputting a reproduced image;

input profiles that are set to correspond to MTF (Modulation Transfer Function) characteristics of the respective input devices, wherein said input profiles are applied for correcting said MTF characteristics of said respective input devices before said image data undergoes said predetermined image processing; and output profiles that are set to correspond to MTF characteristics of the respective output devices, wherein said output profiles are applied, separate from said input profiles, for correcting said MTF characteristics of said respective output devices after said image data undergoes said predetermined image processing.

18. An image reproducing apparatus according to claim 17, wherein said input profiles and said output profiles comprise device profiles for said input devices and device profiles for said output devices, respectively.

19. An image reproducing apparatus according to claim 18, wherein both said device profiles for said input and output devices are incorporated in said image processing device and connected to an image processing space for subjecting said image data received from said input devices to said predetermined image processing.

20. An image reproducing apparatus according to claim 18, wherein said device profiles for said input devices are incorporated in the respective input devices and said device profiles for said output devices are incorporated in the respective output devices.

* * * * *